United States Patent
Wen et al.

(10) Patent No.: US 8,896,892 B2
(45) Date of Patent: Nov. 25, 2014

(54) SYSTEM AND METHOD FOR COLOR CALIBRATION OF A COLOR PRINTING SYSTEM WITH RECORDING MEDIA BRIGHTNESS COMPENSATION

(71) Applicant: Xerox Corporation, Norwalk, CT (US)

(72) Inventors: Zhenhuan Wen, Pittsford, NY (US); Robert E. Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/848,395

(22) Filed: Mar. 21, 2013

(65) Prior Publication Data

US 2014/0285856 A1    Sep. 25, 2014

(51) Int. Cl.
| H04N 1/04 | (2006.01) |
| H04N 1/60 | (2006.01) |
| H04N 1/46 | (2006.01) |
| G01D 18/00 | (2006.01) |

(52) U.S. Cl.
CPC ..................................... *H04N 1/46* (2013.01)
USPC ............ 358/474; 358/1.9; 358/530; 358/504; 702/88

(58) Field of Classification Search
USPC ....................... 358/474, 1.9, 530, 504; 702/88
See application file for complete search history.

(56) References Cited

U.S. PATENT DOCUMENTS

| | | |
|---|---|---|
| 4,500,919 A | 2/1985 | Schreiber |
| 5,107,332 A | 4/1992 | Chan |
| 5,293,258 A | 3/1994 | Dattilo |
| 5,371,615 A | 12/1994 | Eschbach |
| 5,452,112 A | 9/1995 | Wan et al. |
| 5,604,567 A | 2/1997 | Dundas et al. |
| 5,612,902 A | 3/1997 | Stokes |
| 5,625,716 A | 4/1997 | Borg |
| 5,649,072 A | 7/1997 | Balasubramanian |
| 5,739,927 A | 4/1998 | Balasubramanian et al. |
| 5,760,913 A | 6/1998 | Falk |
| 5,809,213 A | 9/1998 | Bhattacharjya |
| 5,818,960 A | 10/1998 | Gregory et al. |
| 6,141,120 A | 10/2000 | Falk |
| 6,157,469 A | 12/2000 | Mestha |
| 6,215,562 B1 | 4/2001 | Michel et al. |
| 6,222,934 B1 | 4/2001 | Tsai |
| 6,243,133 B1 | 6/2001 | Spaulding et al. |
| 6,384,918 B1 | 5/2002 | Hubble et al. |
| 7,064,860 B1 * | 6/2006 | Balasubramanian et al. .. 358/1.9 |
| 7,319,545 B2 * | 1/2008 | Linder et al. ................. 358/1.9 |
| 8,253,975 B2 * | 8/2012 | Bai ............................... 358/1.9 |

(Continued)

*Primary Examiner* — Charlotte M Baker
*Assistant Examiner* — Rury Grisham
(74) *Attorney, Agent, or Firm* — Michael J. Nickerson; Basch & Nickerson LLP

(57) ABSTRACT

A method allows an end user to calibrate a color reproduction device with recording media brightness compensation. A color reproduction device includes a device for converting the native color values of the scanner into a device independent color space, a test target, the desired values of each patch of the test target and a printing device. The method includes printing the test target and scanning it with a scanner that forms a part of the color reproduction device. The device compares the desired values with the values obtained from scanning the printed test target to obtain a set of adjustment values to compensate for drift in the output of the color reproduction device. The compensation includes compensation for utilizing a recording media that does not have the same white characteristics as the recording media that was used to generate the scanner profile used in converting the scanner dependent color space values to a device independent color space values.

6 Claims, 7 Drawing Sheets

(56) References Cited

U.S. PATENT DOCUMENTS

| | | | |
|---|---|---|---|
| 8,593,709 B2* | 11/2013 | Lammens et al. | 358/530 |
| 2003/0086090 A1 | 5/2003 | Tandon et al. | |
| 2004/0114164 A1* | 6/2004 | Linder et al. | 358/1.9 |
| 2004/0184051 A1* | 9/2004 | Bailey | 358/1.9 |
| 2004/0199346 A1* | 10/2004 | Stokes | 702/88 |
| 2006/0158672 A1* | 7/2006 | Kondo | 358/1.9 |
| 2007/0273900 A1* | 11/2007 | Bai | 358/1.9 |
| 2009/0128867 A1* | 5/2009 | Edge | 358/504 |
| 2012/0019881 A1* | 1/2012 | Lammens et al. | 358/530 |
| 2013/0135635 A1* | 5/2013 | Nakamura | 358/1.9 |

* cited by examiner

SYSTEM AND METHOD FOR COLOR CALIBRATION OF A COLOR PRINTING SYSTEM WITH RECORDING MEDIA BRIGHTNESS COMPENSATION

BACKGROUND

Conventional color printers are subject to color drift requiring recalibration of the color rendering process. One cause of such drift is deviation of the underlying components due to age or changes in the environment.

For example, a typical color printing device may vary due to changes in the underlying marking process in response to external conditions. These variations from a known, standard state can result in undesirable variation in the appearance of the output from the color printing device.

Conventionally, a color reprographic device is periodically recalibrated to maintain it in a known state by using a scanner as a colorimeter. The reprographic device creates a color target (conventionally a set of color patches) to be printed by the color reprographic device. By scanning the printed color target and passing the scanned image through a calibration conversion table, a set of color measurements are obtained which can be used to derive a set of curves, which can be used to modify the output characteristics of the device to compensate for drifts.

An example of such a conventional calibration process is disclosed in U.S. Pat. No. 7,319,545. The entire content of U.S. Pat. No. 7,319,545 is hereby incorporated by reference.

The various conventional calibration processes were based upon the color target being printed on a standard recording media (paper). Thus, the accuracy of the calibration process could be negatively impacted if a non-standard recording media is utilized for the rendering of the color target because the brightness (whiteness) of the recording media (paper) can affect the measured values of the color target.

Therefore, it is desirable to provide a calibration process that compensates for the use of a non-standard recording media for the rendering of the test target.

BRIEF DESCRIPTION OF THE DRAWINGS

The drawings are only for purposes of illustrating various embodiments and are not to be construed as limiting, wherein.

DETAILED DESCRIPTION

Figure 1:
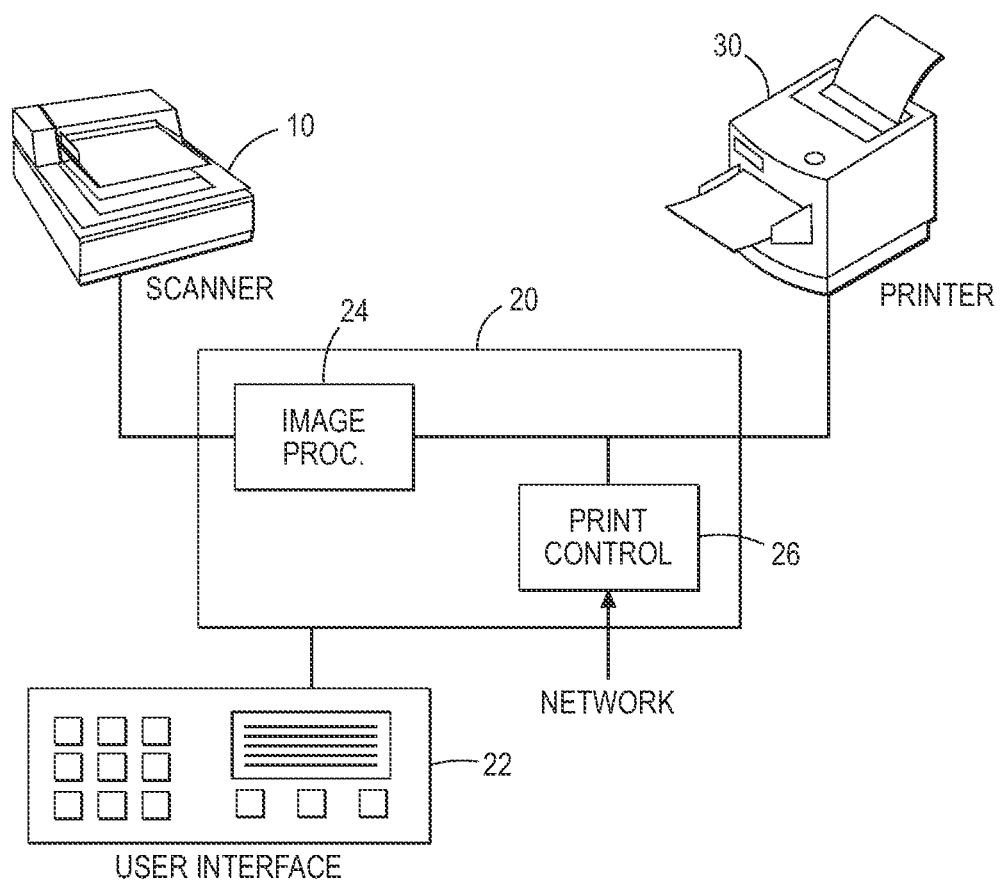
FIG. 1 shows an overview of a conventional reprographic device.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

As illustrated in FIG. 1, a conventional color reprographic system includes an input scanner 10, a control module 20, and an output printer 30. The control module 20 contains a user interface 22 to allow the users of the device to enter control information, an image processor 24, and an optional network processor 26, which that can accept print commands from an external source and process the print commands for printing on the output printer.

When a conventional color reprographic is used for copying a hardcopy original, the hardcopy original is placed on the input scanner 10 and a command is given from the user interface 22 to initiate the copying process. Scanner 10 scans the original to generate an electronic image of the page to be reproduced.

Image processing module 24 accepts the electronic image from the scanner 10 and applies appropriate processing to convert the scanner output to a form suitable for printing. The processing may include conversion from the color space of the scanner; usually red, green and blue (RGB) values; to a color space utilized by the printer. In most conventional color printers, the utilized color space is cyan, magenta, yellow, and black (CMYK), although alternate color spaces can be employed.

Additional operations performed by image processor 24 could include enlargement or reduction of the image size, modifications to the color balance, and/or other operations chosen by the user through manipulation of the user interface 22.

Figure 2:
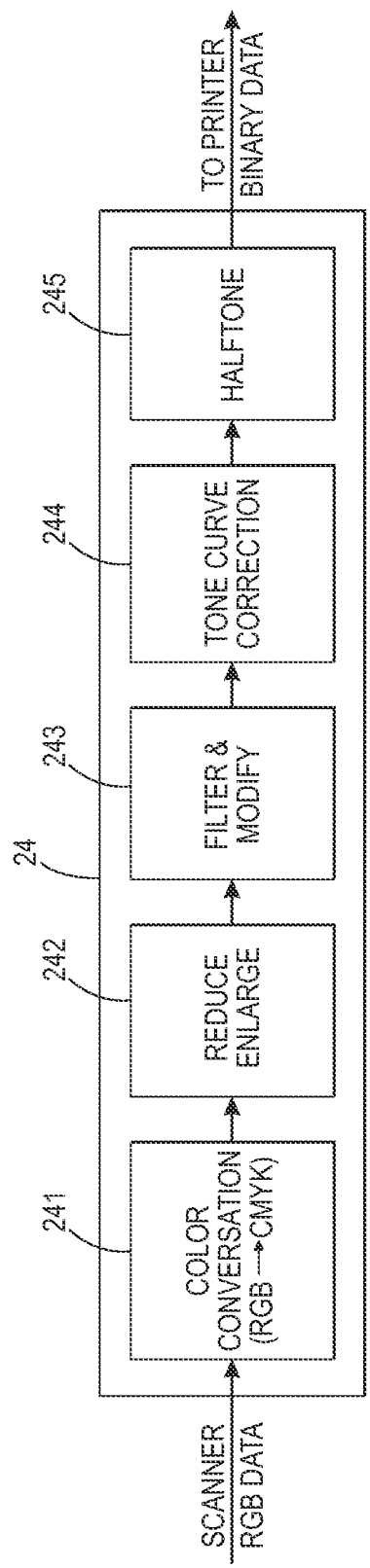
FIG. 2 shows the image processing components in a conventional control module.

As illustrated in FIG. 2, the image processing module 24 of FIG. 1 includes a color space conversion module 241 to convert the RGB values of the scanned image data to CMYK values, as required by the output printer 30. The converted image data is then processed through a reduction/enlargement module 242 to perform any reduction or enlargement in image size, a filter module 243 to perform any further filtering or image modification such as color balance, a tone response curve module 244 to compensate for the tone response curve of the printer, and a halftone module 245 to halftone the data for the output printer.

While the order of these modules may change and some of their functions may be combined in various color reprographic devices, such elements will be readily recognized by those skilled in the art as the principal elements in the image processing section of a color reprographic device. When the reprographic device is operating properly, the output copy will be a reproduction of the original that meets the requirements set by the user.

To implement a recalibration procedure, the development of a standard test target is required. The test target contains a number of color patches, spread across the color space of the output printer device. Printing the standard test target with a device provides an indication of the state of the device and any associated drift therein.

A test target may include step wedges in the CMYK colorants, both solid primary and secondary (pairs of CMYK) colors, and in particular a large number of nearly neutral patches around the a*=b*=0 axis. The test target may also include a design of the layout of the patches including possibly extra marks or patches to help identify the orientation of the target, and thus, provide information as to the identity of particular patches. The test target may include randomization of the patches such that there is no particular dependence of one of the output colorants in either the horizontal or vertical direction.

After the patches are defined in terms of color and layout, the test target design may be implemented by a page description language (PDL) or other format that can be stored as part of the permanent memory of the image processing module. This will enable the image processing module to print the test target during the customer operation of the recalibration process.

As a final step during the design of the test target, the desired L*a*b* value for each patch is determined, either by measurement or by some combination of measurement and modeling. These desired L*a*b* values are stored in the image processing module, as desired aim values representing the calibration test target along with the instructions for printing the test target.

Figure 4:
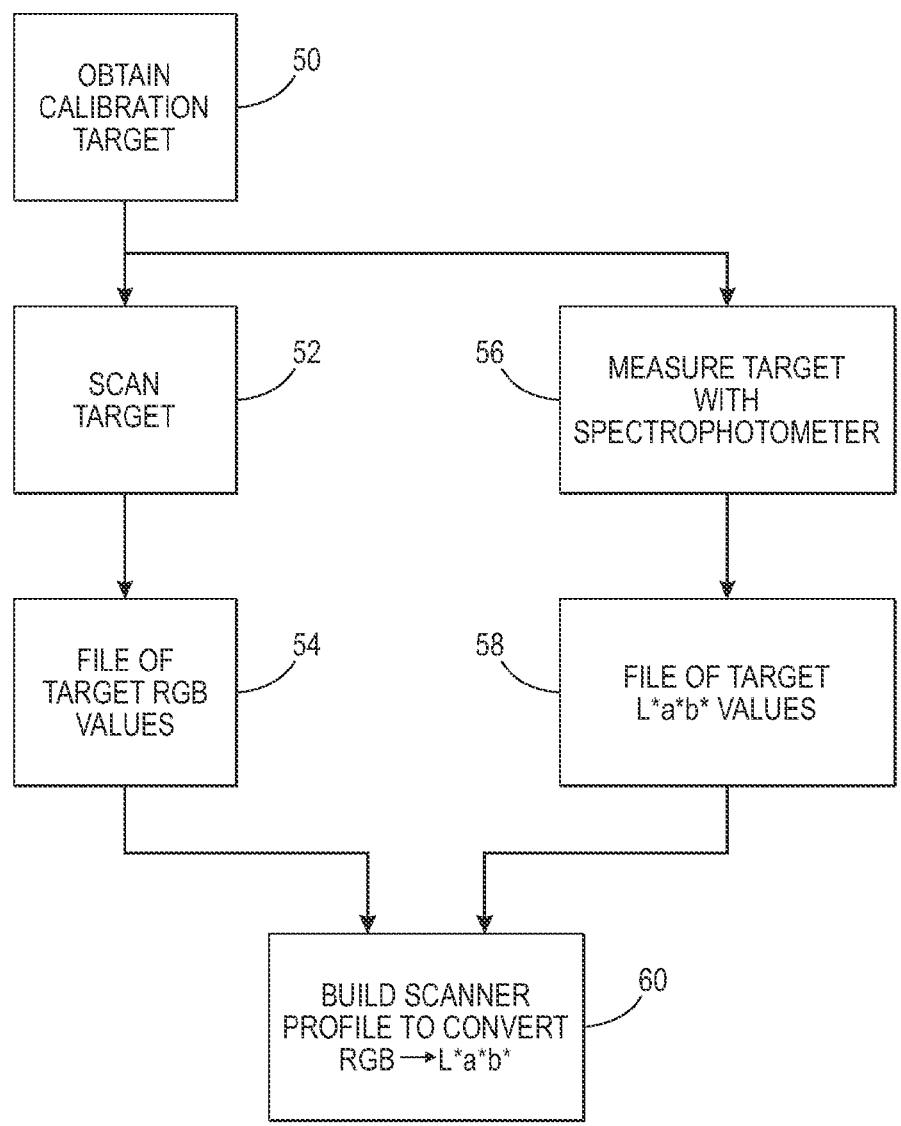
FIG. 4 illustrates a method to generate a scanner profile for a calibration process.

As illustrated in FIG. 4, a calibration target is obtained, at step 50. The calibration target may contain a plurality of color patches representative of a range of colors. The calibration target may, but need not, comprise the same set of patches as designed into the standard test target. The calibration target is scanned using a scanner representative of the scanning device to be manufactured, at step 52. Either a carefully controlled model of the scanner may be used, or alternatively, several samples may be used and the results averaged. Similarly, the calibration target may be scanned with multiple "representative" scanning devices and the results obtained therefrom may be averaged.

The output of this scan is a set of RGB values for each patch in the calibration target. This set of RGB values is stored as target RGB values for the representative scanning device, at step 54.

In addition to the scanning values, a separate set of measurements is made, using a colorimeter to obtain L*a*b* values for each patch in the calibration target, at step 56. The set of L*a*b* values for each patch in the target is compiled as a file of measured L*a*b* values, at step 58. These two data sets; the RGB values and the L*a*b* values; are combined to generate a scanner profile, which can be used to convert RGB values to L*a*b*, at step 60. The details of the scanner profile will depend on the particular method chosen to perform the conversion, ICC profile, three dimensional LUT, or some other method. It is noted that the generation of a scanner profile is well known to those skilled in the art.

Figure 3:
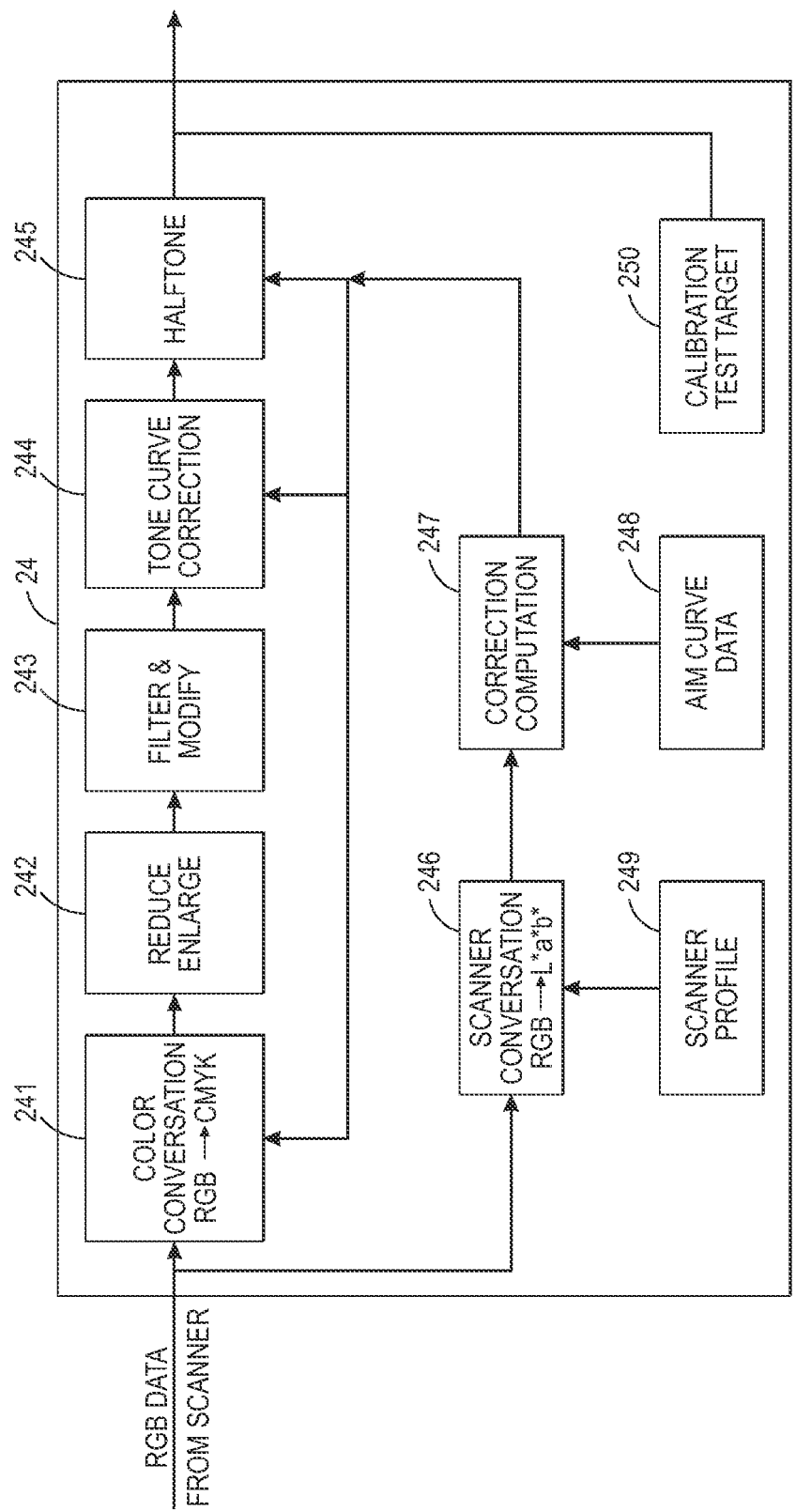
FIG. 3 shows image processing component in a control module of a reprographic device which may be corrected during a calibration process.

As illustrated in FIG. 3, an image processing module 24 has been modified with added functional elements to implement a proposed correction capability. Scanned RGB image data, obtained from scanning a test target generated by the printer 30, is supplied to scanner converter module 246, which in response to the scanner profile 249, generates L*a*b* values for each patch in the target. These L*a*b* values are compared with desired AIM curve values 248, in the correction computation module 247, to generate printer correction values. The generated printer correction values may be fed back to the appropriate image processing modules (241, 244, or 245).

More particularly, image processing module 24 includes a converter module 246 that performs a conversion between the device dependent color space of the scanner (usually RGB), and some device independent color space. Although the described embodiment use CIE L*a*b* color space, HSV, CIE XYZ, or other device independent color space may be used as the device independent color space. It is noted that the converter module 246 can be implemented by software executed by a processor, firmware, hardware, or any combination thereof.

The scanner converter module 246 and the scanner profile 249 may be realized by a calibration conversion processor for converting the scanned image data into a set of device independent color signals. When scanner profile 249 is implemented as a look-up table (LUT), the converter module 246 operates to convert the scanned RGB data for the scanned test target using a LUT 249.

Alternatively, scanner profile 249 may be implemented as an ICC profile. In this situation, the converter module 246 operates to convert the scanned RGB data using the information in the stored ICC profile 249 in accordance with ICC conversion procedures.

The device independent color signals (L*a*b* values) from the converter module 246 are passed to the correction computation module 247, wherein the L*a*b* values are compared with the AIM curve values 248 to generate printer correction values.

The correction computation module 247 and the desired AIM curve values 248 may be realized as a calibration processor which generates a set of color shift correction signals that can compensate for any shifts in the color reproduction properties of the output printer unit by comparing the device independent color signals representative of a printed version of the calibration target with the desired aim values.

With respect to the above described calibration process, the calibration process relies upon the test target being printed on a recording media having the same characteristics as the recording media that was used to generate the scanner profile used to convert the scanner dependent color space values (RGB) to a device independent color space values (L*a*b*).

For example, if the recording media used to generate the scanner profile of 249 was white, but the test target was printed on a blue recording media, the scanner data may be affected by the blue characteristic of the recording media. Thus, the generated scanner dependent color space values (RGB) for the various color patches may not reflect a true characterization of the color of the test patched rendered by the printer.

Moreover, if the recording media used to generate the scanner profile of 249 had a brightness value of 98, but the test target was printed on a recording media with a brightness value of 92, the scanner data may be affected by the brightness characteristic of the recording media. Thus, the generated scanner dependent color space values (RGB) for the various color patches may not reflect a true characterization of the color of the test patched rendered by the printer.

These situations are common wherein a user is performing a calibration but does not have to the type of recording media that was used to generate the scanner profile used to convert the scanner dependent color space values (RGB) to a device independent color space values (L*a*b*). Thus, it is desirable to provide a calibration process that compensates for the use of a non-standard recording media for the rendering of the test target.

Figure 5:
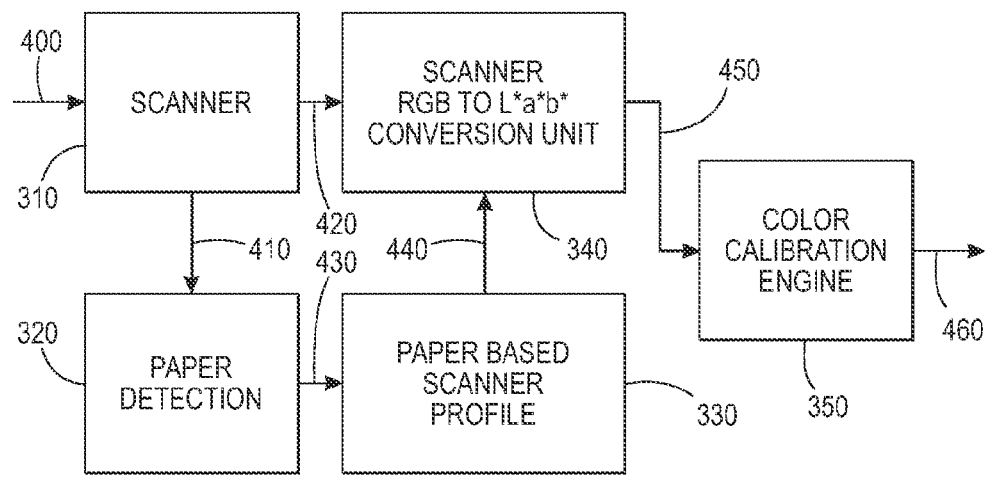
FIG. 5 illustrates a block diagram of calibration system for a reprographic device using a set of look-up tables containing RGB and L*a*b* values.

As illustrated in FIG. 5, a system for providing a calibration of the printing device includes the ability to compensate for the utilization of a recording media that does not have the same characteristics as the recording media that was used to generate the scanner profile used to convert the scanner dependent color space values (RGB) to a device independent color space values (L*a*b*).

The calibration system of FIG. 5 includes a scanner 310 which scans the test target 400 and generates scanner device dependent color space values (RGB) 420 and 410. The generated scanner device dependent color space values (RGB) 420 are communicated to a scanner device dependent color space values (RGB) to device independent color space values (L*a*b*) conversion unit 340.

It is noted that the scanner device dependent color space values (RGB) to device independent color space values (L*a*b*) conversion unit 340 can be implemented by software executed by a processor, firmware, hardware, or any combination thereof.

The generated scanner device dependent color space values (RGB) 410 are communicated to a recording media (paper) detection unit 320. The recording media detection unit 320 compares the scanner device dependent color space values (RGB), associated with a predetermined white point on the test target, with a set of stored reference recording media (paper) white scanner device dependent color space values (RGB) corresponding to the predetermined white point on the test target.

It is noted that the recording media (paper) detection unit 320 can be implemented by software executed by a processor, firmware, hardware, or any combination thereof.

More specifically, the recording media detection unit 320 has stored therein a plurality of sets of white scanner device dependent color space values (RGB), wherein each set of white scanner device dependent color space values (RGB) is associated with a different recording media; i.e., each recording media has a different white characteristic.

The results of the comparison 430 are communicated to a paper based scanner profile unit 330.

Based upon the comparison results 430, the paper based scanner profile unit 330 selects a scanner profile 440, which may include a scanner device dependent color space values (RGB) to device independent color space values (L*a*b*) look-up table (LUT), and communicates the selected scanner profile 440 to the scanner device dependent color space values (RGB) to device independent color space values (L*a*b*) conversion unit 340.

It is noted that the scanner device dependent color space values (RGB) to device independent color space values (L*a*b*) conversion unit 340 can be implemented by software executed by a processor, firmware, hardware, or any combination thereof.

The scanner device dependent color space values (RGB) to device independent color space values (L*a*b*) conversion unit 340 utilizes the communicated scanner profile 440 to convert the scanner device dependent color space values (RGB) 420 to device independent color space values (L*a*b*) 450.

The generated device independent color space values (CIE L*a*b*) 450 are communicated to a color calibration engine 350 which produces the appropriate printer correction values in the same manner as described with respect to the correction computation module 247 and the AIM curve values 248 of FIG. 3. More specifically, color calibration engine 350 compares the device independent color space values (L*a*b*) 450 with AIM curve values and generates the appropriate printer correction values based upon the comparison. The generated printer correction values may be fed back to the appropriate image processing modules (241, 244, or 245 of FIG. 3).

It is noted that the recording media (paper) detection unit 320 and the paper based scanner profile unit 330 may be combined into a single unit wherein the generated scanner device dependent color space values (RGB) are used to select the appropriate scanner profile.

Figure 6:
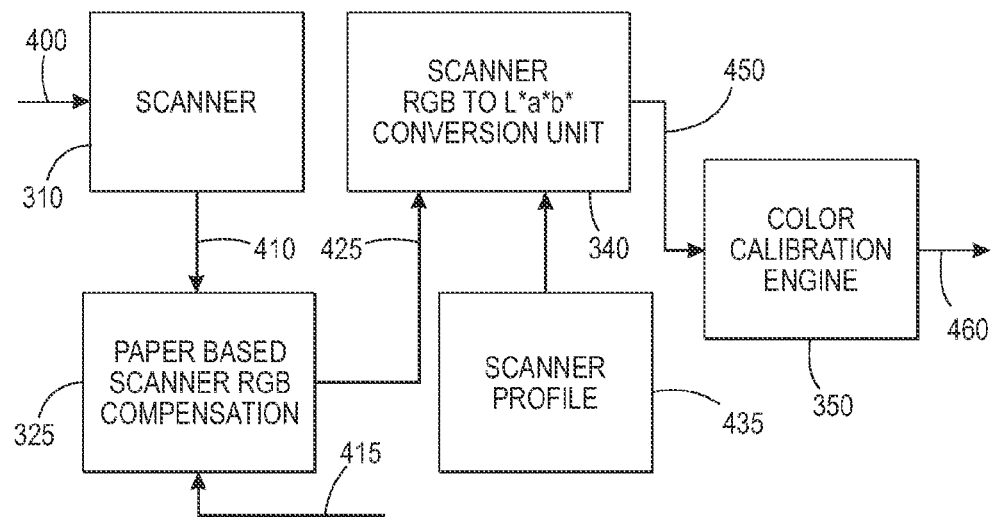
FIG. 6 illustrates a block diagram of calibration system for a reprographic device that compensates generated scanner RGB values based upon a recording media's detected characteristics.

FIG. 6 illustrates another system for providing a calibration of the printing device includes the ability to compensate for the utilization of a recording media that does not have the same characteristics as the recording media that was used to generate the scanner profile used to convert the scanner dependent color space values (RGB) to a device independent color space values (L*a*b*).

The calibration system of FIG. 6 includes a scanner 310 which scans the test target 400 and generates scanner device dependent color space values (RGB) 410.

The generated scanner device dependent color space values (RGB) 410 are communicated to a recording media (paper) based scanner device dependent color space values (RGB) compensation unit 325. The recording media (paper) based scanner device dependent color space values (RGB) compensation unit 325 modifies (corrects) the scanner device dependent color space values (RGB) 410 based upon a relationship between reference scanner device dependent color space values (RGB) 415, corresponding to a predetermined white point on the test target which is associated with the reference recording media, and the generated white scanner device dependent color space values (RGB) 410, corresponding to the predetermined white point on the test target, to generate corrected scanner device dependent color space values (R'G'B') 425.

For example, the scanner device dependent color space values (RGB) 410 can be modified to generate corrected scanner device dependent color space values (R'G'B') 425 using the following equations:

$$R' = R*(R_{whiteRef}/R_{white}); \quad \text{(a)}$$

$$G' = G*(G_{whiteRef}/G_{white}); \text{ and} \quad \text{(b)}$$

$$B' = B*(B_{whiteRef}/B_{white}). \quad \text{(c)}$$

In the above equations, R is the red (R) value generated by the scanner; $R_{whiteRef}$ is the reference scanner device dependent color space value for red (R) corresponding to the predetermined white point on the test target which is associated with the reference recording media; $R_{white}$ is the generated scanner white scanner device dependent color space value for red (R) corresponding to the predetermined white point on the test target; G is the green (G) value generated by the scanner; $G_{whiteRef}$ is the reference scanner device dependent color space value for green (G) corresponding to the predetermined white point on the test target which is associated with the reference recording media; $G_{white}$ is the generated scanner white scanner device dependent color space value for green (G) corresponding to the predetermined white point on the test target; B is the blue (B) value generated by the scanner; $B_{whiteRef}$ is the reference scanner device dependent color space value for blue (B) corresponding to the predetermined white point on the test target which is associated with the reference recording media; and $B_{white}$ is the generated scanner white scanner device dependent color space value for blue (B) corresponding to the predetermined white point on the test target.

The corrected scanner device dependent color space values (R'G'B') 425 are communicated to the scanner device dependent color space values (RGB) to device independent color space values (L*a*b*) conversion unit 340 along with a scanner profile 435, which is associated with the reference recording media.

It is noted that recording media (paper) based scanner device dependent color space values (RGB) compensation unit 325 can be implemented by software executed by a processor, firmware, hardware, or any combination thereof.

The scanner device dependent color space values (RGB) to device independent color space values (L*a*b*) conversion unit 340 converts, using the scanner profile 435, the communicated corrected scanner device dependent color space values (R'G'B') 425 to device independent color space values (L*a*b*).

The generated device independent color space values (L*a*b*) 450 are communicated to a color calibration engine 350 which produces the appropriate printer correction values in the same manner as described with respect to the correction computation module 247 and the AIM curve values 248 of FIG. 3. More specifically, color calibration engine 350 compares the device independent color space values (L*a*b*) 450 with AIM curve values and generates the appropriate printer correction values based upon the comparison. The generated printer correction values may be fed back to the appropriate image processing modules (241, 244, or 245 of FIG. 3).

Figure 7:
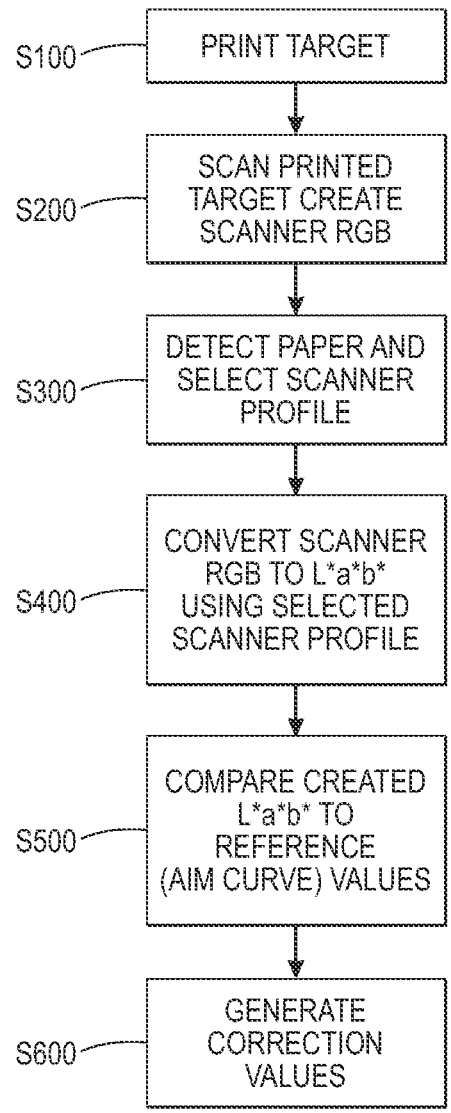
FIG. 7 illustrates a method for calibrating a reprographic device using a set of look-up tables containing RGB and L*a*b* values.

FIG. 7 illustrates a process for providing a calibration of the printing device includes the ability to compensate for the utilization of a recording media that does not have the same characteristics as the recording media that was used to generate the scanner profile used to convert the scanner dependent color space values (RGB) to a device independent color space values (L*a*b*).

The calibration process prints a test target, at step S100, and scans the printed test target and generates scanner device dependent color space values (RGB), at step S200.

At step S300, the type of paper on which the test target is printed is detected by a comparison of the scanner device dependent color space values (RGB), associated with a predetermined white point on the test target, and a set of stored reference recording media (paper) white scanner device dependent color space values (RGB) corresponding to the predetermined white point on the test target. Based upon the detected paper type, it is determined which one of a plurality of paper type based scanner profile is selected for use in a scanner device dependent color space values (RGB) to device independent color space values (L*a*b*) conversion.

At step S400, the scanner device dependent color space values (RGB) are converted to device independent color space values (L*a*b*) using the scanner profile selected in step S300.

The generated device independent color space values (L*a*b*) are compared with reference (L*a*b*) values or AIM curve data used to generate the test target, at step S500.

Based upon the comparison at step S500, printer correction values are generated at step S600 in the same manner as described with respect to the correction computation module 247 and the AIM curve values 248 of FIG. 3. More specifically, a color calibration engine compares the device independent color space values (L*a*b*) with AIM curve values and generates the appropriate printer correction values based upon the comparison.

Figure 8:
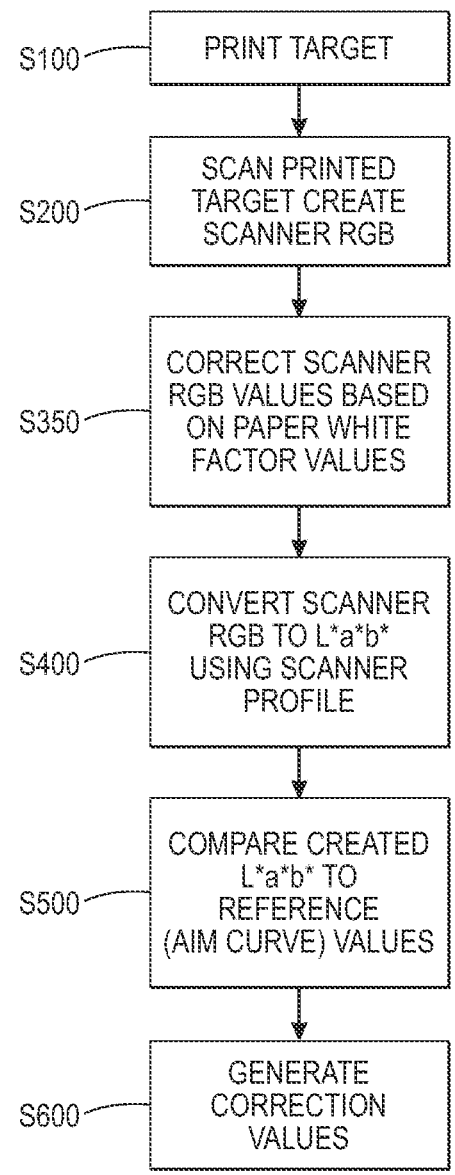
FIG. 8 illustrates a method for calibrating a reprographic device using recording media's detected characteristics based compensated generated scanner RGB values.

FIG. 8 illustrates a process for providing a calibration of the printing device includes the ability to compensate for the utilization of a recording media that does not have the same characteristics as the recording media that was used to generate the scanner profile used to convert the scanner dependent color space values (RGB) to a device independent color space values (L*a*b*).

The calibration process prints a test target, at step S100, and scans the printed test target and generates scanner device dependent color space values (RGB), at step S200.

At step S350, the generated scanner device dependent color space values (RGB) are corrected based upon a relationship between reference scanner device dependent color space values (RGB), corresponding to a predetermined white point on the test target associated with the reference recording media, and the generated white scanner device dependent color space values (RGB), corresponding to the predetermined white point on the test target, to generate corrected scanner device dependent color space values (R'G'B'). This process may utilize the same equations set forth above with respect to FIG. 6.

At step S400, the corrected scanner device dependent color space values (R'G'B') are converted to device independent color space values (L*a*b*) using a scanner profile, which is associated with the reference recording media.

The generated device independent color space values (L*a*b*) are compared with reference (L*a*b*) values or AIM curve data used to generate the test target, at step S500.

Based upon the comparison at step S500, printer correction values are generated at step S600 in the same manner as described with respect to the correction computation module 247 and the AIM curve values 248 of FIG. 3. More specifically, a color calibration engine compares the device independent color space values (L*a*b*) with AIM curve values and generates the appropriate printer correction values based upon the comparison. The generated printer correction values may be fed back to the appropriate image processing modules (241, 244, or 245 of FIG. 3).

In summary, a color reproduction system with drift correction, includes an output device, using a set of tone reproduction compensation curves, rendering a test target having a plurality of color test patches on a recording media; a scanner for scanning the rendered test target having the plurality of color test patches to generate scanned image data representative of the plurality of color test patches, the scanned image data providing a color representation of the plurality of color test patches; and an image processing system receiving the scanned image data. The image processing system device includes a recording media detection unit comparing a plurality of white scanner device dependent color space values with the generated scanned image data associated with a predetermined white point located on the rendered test target, the recording media detection unit selecting, based upon the comparison of the plurality of white scanner device dependent color space values with the generated scanned image data associated with a predetermined white point located on the rendered test target, a scanner profile from a plurality of scanner profiles, each scanner profile corresponding to a recording media having a different white characteristic; a scanner device dependent color space values to device independent color space values conversion unit converting the generated scanned image data to device independent color space values based upon the selected scanner profile, and a color calibration unit comparing the generated device independent color space values with reference device independent color space values. The color calibration unit modifies the set of tone reproduction compensation curves based upon the comparison of the generated device independent color space values with reference device independent color space values.

The color calibration unit may modify a scanner device dependent color space values to a printer device dependent color space values look-up table used in non-calibration processes based upon the comparison of the generated device independent color space values with reference device independent color space values.

The test target may have a plurality of patches that are neutral or near neutral in color.

The system scanner profile may include a scanner device dependent color space values to device independent color space values look-up table corresponding to a reference recording medium.

A color reproduction system with drift correction includes an output device, using a set of tone reproduction compensation curves, rendering a test target having a plurality of color test patches on a recording media; a scanner for scanning the rendered test target having the plurality of color test patches to generate scanned image data representative of the plurality of color test patches, the scanned image data providing a color representation of the plurality of color test patches; and an image processing system receiving the scanned image data. The image processing system device includes a scanner device dependent color space values compensation unit correcting the generated scanned image data based upon a relationship between reference scanner device dependent color space values, corresponding to a predetermined white point on the test target, and the generated scanned image data corresponding to the predetermined white point on the test target; a scanner device dependent color space values to device independent color space values conversion unit converting the corrected scanned image data to device independent color space values based upon a scanner profile associated with a predetermined white characteristic, and a color calibration unit comparing the generated device independent color space values with reference device independent color space values. The color calibration unit modifies the set of tone reproduction compensation curves based upon the comparison of the generated device independent color space values with reference device independent color space values.

The color calibration unit may modify a scanner device dependent color space values to a printer device dependent color space values look-up table used in non-calibration processes based upon the comparison of the generated device independent color space values with reference device independent color space values.

The test target may have a plurality of patches that are neutral or near neutral in color.

The corrected scanned image data may be generated using $R'=R^*(R_{whiteRef}/R_{white})$, $G'=G^*(G_{whiteRef}/G_{white})$, and $B'=B^*(B_{whiteRef}/B_{white})$, and wherein R is the red (R) value generated by the scanner; R' is the corrected scanned image data for the red (R) value, $R_{whiteRef}$ is the reference scanner device dependent color space value for red (R) corresponding to the predetermined white point on the test target associated with the reference recording media; $R_{white}$ is the generated scanner white scanner device dependent color space value for red (R) corresponding to the predetermined white point on the test target; G is the green (G) value generated by the scanner; G' is the corrected scanned image data for the green (G) value, $G_{whiteRef}$ is the reference scanner device dependent color space value for green (G) corresponding to the predetermined white point on the test target associated with the reference recording media; $G_{white}$ is the generated scanner white scanner device dependent color space value for green (G) corresponding to the predetermined white point on the test target; B is the blue (B) value generated by the scanner; B' is the corrected scanned image data for the blue (B) value, $B_{whiteRef}$ is the reference scanner device dependent color space value for blue (B) corresponding to the predetermined white point on the test target associated with the reference recording media; and $B_{white}$ is the generated scanner white scanner device dependent color space value for blue (B) corresponding to the predetermined white point on the test target.

The scanner profile may include a scanner device dependent color space values to device independent color space values look-up table corresponding to a reference recording medium.

A method for correcting drift in a color reproduction system, renders, using a set of tone reproduction compensation curves, a test target having a plurality of color test patches on a recording media; scans the rendered test target having the plurality of color test patches; generates scanned image data representative of the scanned plurality of color test patches, the scanned image data providing a color representation of the plurality of color test patches; compares a plurality of white scanner device dependent color space values with the generated scanned image data associated with a predetermined white point located on the rendered test target; selects, based upon the comparison of the plurality of white scanner device dependent color space values with the generated scanned image data associated with a predetermined white point located on the rendered test target, a scanner profile from a plurality of scanner profiles, each scanner profile corresponding to a recording media having a different white characteristic; converts the generated scanned image data to device independent color space values based upon the selected scanner profile; compares the generated device independent color space values with reference device independent color space values; and modifies the set of tone reproduction compensation curves based upon the comparison of the generated device independent color space values with reference device independent color space values.

The method may modify a scanner device dependent color space values to a printer device dependent color space values look-up table used in non-calibration processes based upon the comparison of the generated device independent color space values with reference device independent color space values.

The test target may have a plurality of patches that are neutral or near neutral in color.

The scanner profile may include a scanner device dependent color space values to device independent color space values look-up table corresponding to a reference recording medium.

A method for correcting drift in a color reproduction system renders, using a set of tone reproduction compensation curves, a test target having a plurality of color test patches on a recording media; scans the rendered test target having the plurality of color test patches; generates scanned image data representative of the scanned plurality of color test patches, the scanned image data providing a color representation of the plurality of color test patches; corrects the generated scanned image data based upon a relationship between reference scanner device dependent color space values, corresponding to a predetermined white point on the test target, and the generated scanned image data corresponding to the predetermined white point on the test target; converts the corrected scanned image data to device independent color space values based upon a scanner profile associated with a predetermined white characteristic; compares the generated device independent color space values with reference device independent color space values; and modifies the set of tone reproduction compensation curves based upon the comparison of the generated device independent color space values with reference device independent color space values.

The method may modify a scanner device dependent color space values to a printer device dependent color space values look-up table used in non-calibration processes based upon the comparison of the generated device independent color space values with reference device independent color space values.

The test target may have a plurality of patches that are neutral or near neutral in color.

The corrected scanned image data may be generated using $R'=R*(R_{whiteRef}/R_{white})$, $G'=G*(G_{whiteRef}/G_{white})$, and $B'=B*(B_{whiteRef}/B_{white})$, and wherein R is the red (R) value generated by the scanner; R' is the corrected scanned image data for the red (R) value, $R_{whiteRef}$ is the reference scanner device dependent color space value for red (R) corresponding to the predetermined white point on the test target associated with the reference recording media; $R_{white}$ is the generated scanner white scanner device dependent color space value for red (R) corresponding to the predetermined white point on the test target; G is the green (G) value generated by the scanner; G' is the corrected scanned image data for the green (G) value, $G_{whiteRef}$ is the reference scanner device dependent color space value for green (G) corresponding to the predetermined white point on the test target associated with the reference recording media; $G_{white}$ is the generated scanner white scanner device dependent color space value for green (G) corresponding to the predetermined white point on the test target; B is the blue (B) value generated by the scanner; B' is the corrected scanned image data for the blue (B) value, $B_{whiteRef}$ is the reference scanner device dependent color space value for blue (B) corresponding to the predetermined white point on the test target associated with the reference recording media; and $B_{white}$ is the generated scanner white scanner device dependent color space value for blue (B) corresponding to the predetermined white point on the test target.

The scanner profile may include a scanner device dependent color space values to device independent color space values look-up table corresponding to a reference recording medium.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A color reproduction system with drift correction, comprising:
   an output device, using a set of tone reproduction compensation curves, rendering a test target having a plurality of color test patches on a recording media, said output device having reference device independent color space values associated therewith;
   a scanner for scanning said rendered test target having said plurality of color test patches to generate scanned RGB image data representative of said plurality of color test patches, the scanned RGB image data providing a color representation of said plurality of color test patches, the scanned RGB image data having a red color component, a green color component, and a blue color component; and
   an image processing system receiving said scanned RGB image data;
   said image processing system including a scanner profile associated with a reference recording media, the reference recording media being the recording media used in generating said scanner profile;
   said scanner profile including a reference red scanner device dependent color space value, $R_{whiteRef}$, corresponding to a predetermined white point on a test target associated with the reference recording media;
   said scanner profile including a reference green scanner device dependent color space value, $G_{whiteRef}$, corresponding to a predetermined white point on a test target associated with the reference recording media;
   said scanner profile including a reference blue scanner device dependent color space value, $B_{whiteRef}$, corresponding to a predetermined white point on a test target associated with the reference recording media;
   said image processing system correcting each color component of said received scanned RGB image data;
   said received red color component of the received scanned RGB image data being corrected using $R'=R*(R_{whiteRef}/R_{white})$, wherein R is the red color component value generated by said scanner; R' is the corrected red color component of the received scanned RGB image data, and $R_{white}$ is the generated scanner white scanner device dependent color space value for red color component corresponding to the predetermined white point on the test target;
   said received green color component of the received scanned RGB image data being corrected using $G'=G*(G_{whiteRef}/G_{white})$, wherein G is the green color component value generated by said scanner; G' is the corrected green color component of the received scanned RGB image data, and $G_{white}$ is the generated scanner white scanner device dependent color space value for green color component corresponding to the predetermined white point on the test target;
   said received blue color component of the received scanned RGB image data being corrected using $B'=B*(B_{whiteRef}/B_{white})$, wherein B is the blue color component value generated by said scanner; B' is the corrected blue color component of the received scanned RGB image data, and $B_{white}$ is the generated scanner white scanner device dependent color space value for blue color component corresponding to the predetermined white point on the test target;
   said image processing system converting the corrected scanned RGB image data to device independent color space values based upon a said scanner profile associated with the reference recording media;
   said image processing system comparing the generated device independent color space values with said reference device independent color space values associated with said output device;
   said image processing system modifying the set of tone reproduction compensation curves based upon the comparison of the generated device independent color space values with said reference device independent color space values associated with said output device.

2. The system as claimed in claim 1, wherein said image processing system modifies a scanner device dependent color space values to a printer device dependent color space values look-up table used in non-calibration processes based upon the comparison of the generated device independent color space values with said reference device independent color space values associated with said output device.

3. The system as claimed in claim 1, wherein the test target has a plurality of patches that are neutral or near neutral in color.

4. A method for correcting drift in a color reproduction system, comprising:

(a) rendering, using an output device having a set of tone reproduction compensation curves, a test target having a plurality of color test patches on a recording media, the output device having reference device independent color space values associated therewith;

(b) scanning the rendered test target having the plurality of color test patches;

(c) generating scanned RGB image data representative of the scanned plurality of color test patches, the scanned RGB image data providing a color representation of said plurality of color test patches, the scanned RGB image data having a red color component, a green color component, and a blue color component;

(d) correcting each color component of the received scanned RGB image data;

said correcting of each color component of the received scanned RGB image data including, (d1) correcting the received red color component of the received scanned RGB image data using $R'=R*(R_{whiteRef}/R_{white})$, wherein R is the red color component value generated by scanning; R' is the corrected red color component of the received scanned RGB image data, $R_{whiteRef}$ is a reference red scanner device dependent color space value corresponding to a predetermined white point on a test target associated with the reference recording media, and $R_{white}$ is the generated scanner white scanner device dependent color space value for red color component corresponding to the predetermined white point on the test target, (d2) correcting the received green color component of the received scanned RGB image data using $G'=G*(G_{whiteRef}/G_{white})$, wherein G is the green color component value generated by said scanner; G' is the corrected green color component of the received scanned RGB image data, $G_{whiteRef}$ is a reference green scanner device dependent color space value corresponding to a predetermined white point on a test target associated with the reference recording media, and $G_{white}$ is the generated scanner white scanner device dependent color space value for green color component corresponding to the predetermined white point on the test target, and (d3) correcting the received blue color component of the received scanned RGB image data being corrected using $B'=B*(B_{whiteRef}/B_{white})$, wherein B is the blue color component value generated by said scanner; B' is the corrected blue color component of the received scanned RGB image data, $B_{whiteRef}$ is a reference blue scanner device dependent color space value corresponding to a predetermined white point on a test target associated with the reference recording media, and $B_{white}$ is the generated scanner white scanner device dependent color space value for blue color component corresponding to the predetermined white point on the test target;

(e) converting the corrected scanned RGB image data to device independent color space values based upon a scanner profile associated with a reference recording media, the reference recording media being the recording media used in generating the scanner profile;

(f) comparing the generated device independent color space values with the reference device independent color space values associated with the output device; and (g) modifying the set of tone reproduction compensation curves based upon the comparison of the generated device independent color space values with the reference device independent color space values associated with the output device.

5. The method as claimed in claim 4, further comprising:

(h) modifying a scanner device dependent color space values to a printer device dependent color space values look-up table used in non-calibration processes based upon the comparison of the generated device independent color space values with the reference device independent color space values associated with the output device.

6. The method as claimed in claim 4, wherein the test target has a plurality of patches that are neutral or near neutral in color.

* * * * *